(12) United States Patent
Burton

(10) Patent No.: US 11,532,984 B2
(45) Date of Patent: Dec. 20, 2022

(54) VOLTAGE REGULATOR CIRCUIT WITH PARALLEL ARRANGEMENT OF DISCONTINUOUS CONDUCTION MODE VOLTAGE REGULATORS

(71) Applicant: Intel Corporation, Santa Clara, CA (US)

(72) Inventor: Edward Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 16/449,129

(22) Filed: Jun. 21, 2019

(65) Prior Publication Data

US 2020/0403515 A1  Dec. 24, 2020

(51) Int. Cl.
  *H02M 3/158* (2006.01)
  *H02M 1/08* (2006.01)
  *H02M 1/00* (2006.01)

(52) U.S. Cl.
  CPC ......... *H02M 3/1584* (2013.01); *H02M 1/083* (2013.01); *H02M 1/0009* (2021.05)

(58) Field of Classification Search
  CPC .............. H02M 1/083; H02M 3/1584; H02M 2001/0009
  See application file for complete search history.

(56) References Cited

U.S. PATENT DOCUMENTS

| | | | |
|---|---|---|---|
| 7,414,383 B2 | 8/2008 | Burton et al. | |
| 9,696,350 B2 | 7/2017 | Burton et al. | |
| 9,837,906 B1 * | 12/2017 | Childs | H02M 3/1584 |
| 2011/0316514 A1 * | 12/2011 | Deboy | H02M 3/1584 323/312 |
| 2016/0254689 A1 * | 9/2016 | Lee | H02M 3/158 320/107 |
| 2017/0179822 A1 * | 6/2017 | Kobayashi | H02M 3/1584 |
| 2018/0123440 A1 | 5/2018 | Lee et al. | |
| 2018/0175734 A1 * | 6/2018 | Gherghescu | H02M 3/1584 |
| 2018/0294726 A1 | 10/2018 | Priego et al. | |

FOREIGN PATENT DOCUMENTS

| | | |
|---|---|---|
| EP | 3499699 A1 | 6/2019 |
| KR | 10-1808607 B1 | 12/2017 |

OTHER PUBLICATIONS

International Search Report and Written Opinion dated Jul. 9, 2020 for International Application No. PCT/US2020/023975, 11 pages.

* cited by examiner

*Primary Examiner* — Kyle J Moody
*Assistant Examiner* — Jye-June Lee
(74) *Attorney, Agent, or Firm* — Schwabe, Williamson & Wyatt, P.C.

(57) ABSTRACT

Various embodiments provide a parallel arrangement of discontinuous conduction mode (DCM) voltage regulators to provide a regulated voltage to a load. The individual DCM voltage regulators may be triggered (e.g., switched to a charge state) when the regulated voltage falls below a lower threshold. Different DCM voltage regulators in the parallel arrangement may have different lower thresholds. In some embodiments, different DCM voltage regulators may include different inductance and/or transistor size (e.g., to tune the DCM voltage regulators to different current handling capabilities). Other embodiments may be described and claimed.

23 Claims, 4 Drawing Sheets

VOLTAGE REGULATOR CIRCUIT WITH PARALLEL ARRANGEMENT OF DISCONTINUOUS CONDUCTION MODE VOLTAGE REGULATORS

FIELD

Embodiments of the present invention relate generally to the technical field of electronic circuits, and more particularly to a voltage regulator circuit with a parallel arrangement of discontinuous conduction mode voltage regulators.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Hysteretic discontinuous conduction mode (DCM) voltage regulators have good performance characteristics (e.g., high efficiency and low ripple) at low current loads. However, these DCM voltage regulators have a relatively low current handling capability. The DCM voltage regulator can be modified to raise the current handling capability, however this sacrifices the efficiency and/or voltage ripple. Voltage regulators are typically designed to handle worst case loads. Accordingly, continuous conduction mode (CCM) voltage regulators are typically used for applications in which a high current draw may be present, even if the high current draw rarely, if ever, occurs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
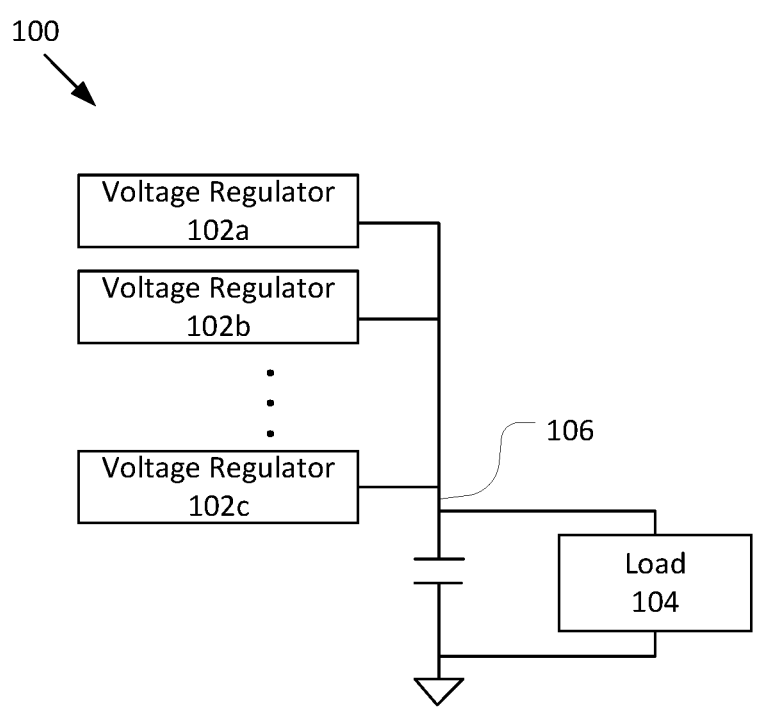
FIG. 1 illustrates a voltage regulator circuit including a parallel arrangement of discontinuous conduction mode (DCM) voltage regulators, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments herein provide a parallel arrangement of voltage regulators to provide a regulated output voltage to a load (e.g., a circuit block). The individual voltage regulators may include an inductor coupled to a driver. In various embodiments, the individual voltage regulators may be discontinuous mode (DCM) voltage regulators, such as hysteretic DCM voltage regulators. Accordingly, when the voltage regulator is triggered (e.g., when the output voltage falls below a lower threshold), the voltage regulator may transition to a first state in which the driver couples the inductor to a power supply (e.g., via a first transistor, also referred to as a pull-up transistor or high-side transistor), thereby running current through the inductor and supplying current to the load.

The voltage regulator may thereafter switch from the first state to the second state. For example, the voltage regulator may switch to the second state when the output voltage reaches an upper threshold, after a pre-defined time period in the first state, and/or based on one or more other criteria. In the second state, the driver may uncouple the inductor from the power supply and couple the inductor to ground (e.g., via a second transistor, also referred to as a pull-down transistor or low-side transistor), thereby causing the current through the inductor to decrease. When the current through the inductor reaches zero, the voltage regulator may switch to a third state, in which the inductor is uncoupled from both the power supply and the ground terminal (e.g., both the first and second transistors are off). The voltage regulator may remain in the third state until the voltage regulator is triggered again.

As discussed above, the individual voltage regulators may be triggered to enter the first state when the output voltage of the circuit drops below a lower threshold. In various embodiments, the lower threshold may be different for different voltage regulators of the parallel arrangement of voltage regulators. Additionally, different voltage regulators may be designed for different current capabilities.

For example, a first voltage regulator may be designed for lower current levels. The first voltage regulator may have a greater lower threshold, so that it will turn on before the one or more other voltage regulators as the load draws current. The first voltage regulator may include a smaller first transistor (pull-up transistor) and/or a higher inductance than the one or more other voltage regulators. Accordingly, the first voltage regulator may have high efficiency and provide the output voltage with low ripple and tight control with a low current draw. At a low current draw of the load, the first voltage regulator may exclusively provide the regulated output voltage (the one or more other voltage regulators may remain in the third state).

As the current draw of the load increases, the first voltage regulator may not be able to provide all of the current required by the load, and the output voltage may drop below the lower threshold of the first voltage regulator. A second voltage regulator of the parallel arrangement may have a lower threshold that is less than the lower threshold of the first voltage regulator, and may therefore be triggered to enter the first state when the current draw of the load increases. The second voltage regulator may have a larger first transistor (pull-up transistor) and/or a lower inductance than the first voltage regulator. Accordingly, the second voltage regulator may be tuned for providing more current than the first voltage regulator.

In some embodiments, the individual voltage regulators may be hysteretic DCM voltage regulators. Accordingly, the voltage regulators may switch from the first state to the second state when the output voltage exceeds an upper threshold. In some embodiments, the upper threshold for different hysteretic DCM voltage regulators may be different. For example, a voltage regulator with a higher lower threshold may have a lesser upper threshold than a voltage regulator with a lesser lower threshold. In other embodiments, different hysteretic DCM voltage regulators may have the same upper threshold.

Additionally, in other embodiments, the individual voltage regulators may switch from the first state to the second state based on one or more other criteria. For example, the individual voltage regulators may be in the first state for predefined time, after which the voltage regulator switches to the second state. In some embodiments, different voltage regulators may use different criteria for switching from the first state to the second state.

Furthermore, in some embodiments and/or under some conditions, the voltage regulator may switch directly from the second state back to the first state, without passing through the third state. This may enable the voltage regulator to deliver higher current to the load. For example, in some embodiments, the voltage regulator may switch from the second state to the first state if one or more criteria are met (e.g., the output voltage falling below the lower voltage threshold or another voltage threshold) prior to the inductor current reaching zero.

The circuit described herein may have any suitable number of voltage regulators coupled in parallel with different lower and/or upper thresholds, different inductances, and/or different sizes of pull-up transistor, such as 2 to 8 or more voltage regulators. For the purposes of this disclosure, relative terms such as greater, lesser, larger, smaller, different, etc. refer to differences (e.g., in inductance or the feature size of a transistor) of greater than 10% and specifically exclude differences due to normal manufacturing variability or other phenomena that may result in unintentional and relatively small differences in value.

FIG. 1 illustrates a circuit 100 in accordance with various embodiments. The circuit 100 may include a plurality of voltage regulators 102a-c coupled in parallel with one another. The voltage regulators 102a-c may be coupled to a load 104 to provide a regulated supply voltage to the load 104 at an output node 106. Each voltage regulator 102a-c may be a DCM voltage regulator. The individual voltage regulators 102a-c may be triggered to switch to the first state (charge state) when the regulated supply voltage drops below a lower threshold.

Figure 2:
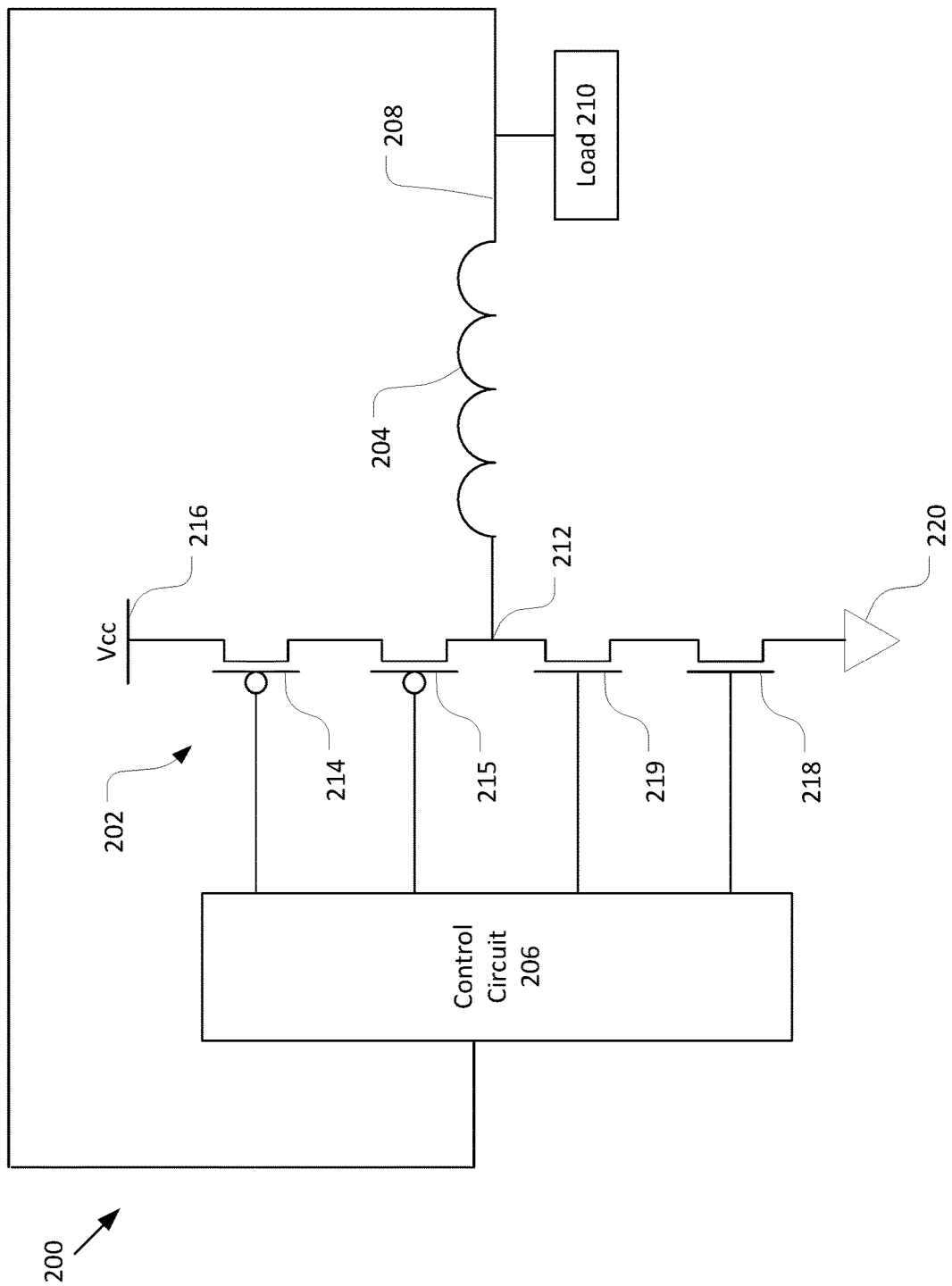
FIG. 2 illustrates a discontinuous mode voltage regulator that may be used in the circuit of FIG. 1, in accordance with various embodiments.

For example, FIG. 2 illustrates one example of a voltage regulator 200 that may correspond to individual voltage regulators 102a-f in some embodiments. Other embodiments may include another suitable design of voltage regulator 102a-f, and/or more, fewer, or different components than those shown in FIG. 2.

Voltage regulator 200 may include a driver circuit 202 coupled to an inductor 204. The voltage regulator 200 may further include a control circuit 206 coupled to the driver circuit 202 to control the driver circuit 202 based on the voltage level of the regulated output voltage. The control circuit 206 may control the driver circuit 202 based on a voltage level at an output node 208 that is coupled to a load 210 (e.g., that corresponds to load 104).

In some embodiments, the inductor 204 of the voltage regulator 200 may be coupled between the output node 208 and an internal node 212 of the driver circuit 202. The driver circuit 202 may include a pull-up transistor 214 (also referred to as a power transistor) coupled between the internal node 212 and a supply rail 216. The supply rail 216 may receive a supply voltage (e.g., Vcc). The driver circuit 202 may further include a pull-down transistor 218 coupled between the internal node 212 and a ground terminal 220.

The driver circuit 202 shown in FIG. 2 has a cascode configuration that includes an additional pull-up transistor 215 coupled between the pull-up transistor 214 and the internal node 212, and an additional pull-down transistor 219 coupled between the pull-down transistor 218 and the internal node 212. In some embodiments, the pull-up transistor 215 may receive the same control signal as the pull-up transistor 214 and/or the pull-down transistor 219 may receive the same control signal as the pull-down transistor 218. In other embodiments, the pull-up transistors 214-215 and/or the pull-down transistors 218-219 may receive different control signals.

Other embodiments of the driver circuit 202 may include additional components, fewer components, and/or a different configuration of the driver circuit 202 and/or inductor 204. For example, the driver circuit 202 may include only a single pull-up transistor and/or pull-down transistor. Alternatively, the driver circuit 202 may include one or more additional transistors coupled between the supply rail 216 and the internal node 212 and/or one or more additional transistors coupled between the internal node 212 and the ground terminal 220.

In various embodiments, the control circuit 206 may provide respective control signals to the gate terminals of the pull-up transistors 214-215 and pull-down transistors 218-219 to control operation of the driver circuit 202. For example, when the voltage level at the output node 208 drops below a first threshold, the control circuit 206 may place the voltage regulator 200 in a first state (e.g., charge state). As part of the first state, the control circuit 206 may turn on the pull-up transistor 214 to conductively couple the output node 208 to the supply rail 216 via the inductor 204. This causes current to flow through the inductor 204 to the output node 208 and thereby raise the voltage level at the output node 208. The pull-down transistor 218 may be off during the first mode.

The control circuit 206 may thereafter switch the voltage regulator 200 from the first state to the second state based on one or more criteria. For example, the control circuit 206 may switch the voltage regulator 200 from the first state to the second state when the output voltage reaches an upper threshold, after a pre-defined time period in the first state, and/or based on one or more other criteria. To switch the voltage regulator 200 from the first state to the second state, the control circuit 206 may turn off the pull-up transistor 214 to conductively uncouple the output node 208 from the supply rail 216. The control circuit 206 may additionally turn on the pull-down transistor 218 to conductively couple the output node 208 to the ground terminal 220.

The voltage regulator 200 may remain in the second state (e.g., with the pull-down transistor 218 on) until the current through the inductor 204 drops to zero. At that time, the control circuit 206 may switch the voltage regulator 200 from the second state to the third state (e.g., tri-state mode), in which the pull-down transistor 218 and the pull-up transistor 214 are both off. For example, the control circuit 206 may monitor the current through the inductor 204 to detect when the current reaches zero, and may turn off the pull-down transistor 218 responsive to the detection (while the pull-up transistor 214 remains off).

In some embodiments and/or under some conditions, the control circuit 206 may switch the voltage regulator 200 directly from the second state back to the first state, without passing through the third state. This may enable the voltage regulator 200 to deliver higher current to the load. For example, in some embodiments, the voltage regulator 200 may switch from the second state to the first state if one or more criteria are met (e.g., the output voltage falling below the lower voltage threshold or another voltage threshold) prior to the inductor current through the inductor 204 reaching zero.

In some embodiments, one or more components of the control circuit 206 may be shared with the control circuit of other voltage regulators of the parallel combination of voltage regulators (e.g., voltage regulators 102a-c). In other embodiments, the control circuits 206 of the different voltage regulators may be separate.

Referring again to FIG. 1, in various embodiments, the lower thresholds for different voltage regulators 102a-c of the circuit 100 may be different. For example, voltage regulator 102a may have a greater lower threshold than the voltage regulator 102c. The lower threshold of the voltage regulator 102b may be between the lower thresholds of the voltage regulator 102a and voltage regulator 102c. Accordingly, the voltage regulator 102a may turn on at a greater voltage level of the regulated output voltage of the circuit 100 (e.g., at a lower current draw of the load 104) than the voltage regulator 102b and 102c.

In some embodiments, the voltage regulators 102a-c may also have different upper thresholds. For example, the voltage regulator 102a may have a lesser upper threshold than the voltage regulator 102b and/or 102c. In other embodiments, the voltage regulators 102a-c may have the same upper threshold and/or may switch from the first state to the second state based on one or more other criteria.

Additionally, in some embodiments, different voltage regulators 102a-c may be designed for different current capabilities. For example, the voltage regulator 102a may include a smaller pull-up transistor (power transistor, e.g., pull-up transistor 214) and/or a higher inductance (e.g., an inductor 204 with a greater inductance value). Accordingly, the voltage regulator 102a may have high efficiency and provide the output voltage with low ripple and tight control with a low current draw. The larger pull-up transistor and/or lower inductance of the voltage regulator 102c may enable the voltage regulator 102c to supply higher current than the voltage regulator 102a. The voltage regulator 102b may include a pull-up transistor size and/or inductance that are between the values of the voltage regulators 102a and 102c.

At low current draw of the load 104, the voltage regulator 102a may exclusively regulate the output voltage. For example, the voltage regulator 102a may switch to the first state when the output voltage drops below the lower threshold of the voltage regulator 102a, and may switch from the first state to the second state when the output voltage rises above the upper threshold of the voltage regulator 102a and/or based on one or more other criteria (e.g., an amount of time in the first state). The relatively small pull-up transistor and/or relatively large inductance of the voltage regulator 102a may enable the voltage regulator 102a to efficiently regulate the output voltage with low ripple.

As the current draw of the load 104 increases, the voltage regulator 102a may not be able to provide all of the current required by the load 104, and the output voltage may drop below the lower threshold of the voltage regulator 102b. Accordingly, the voltage regulator 102b may be triggered to switch to the first state to provide current to the load 106 and regulate the output voltage along with the voltage regulator 102a. If the voltage level of the output voltage drops further (e.g., based on the current draw of the load 104), one or more additional voltage regulators may be triggered to switch to the first state (e.g., the voltage regulator 102c and/or one or more intermediate voltage regulators between the voltage regulators 102b and 102c).

Accordingly, as discussed above, the circuit 100 may provide a regulated output voltage with high efficiency and low ripple at low current draw of the load 104, while also being able to provide high current draw to the load 104 when needed. Furthermore, the circuit 100 may not include any continuous conduction mode (CCM) voltage regulators (e.g., all voltage regulators 102a-c may be DCM voltage regulators. Accordingly, the circuit 100 may not include the additional compensation circuitry and/or other circuitry (e.g., pulse-width modulators, etc.) required by CCM voltage regulators.

In some embodiments, the different voltage regulators of the parallel arrangement of voltage regulators may be triggered based on the output voltage received via different sense points at different locations of the output node. For example, multiple circuit blocks may be coupled to the output node to receive the regulated output voltage. A first voltage regulator may be triggered based on a first feedback signal from a first sense point of the output node, while a second voltage regulator may be triggered based on a second feedback signal from a second sense point that is different from the first sense point.

Figure 3:
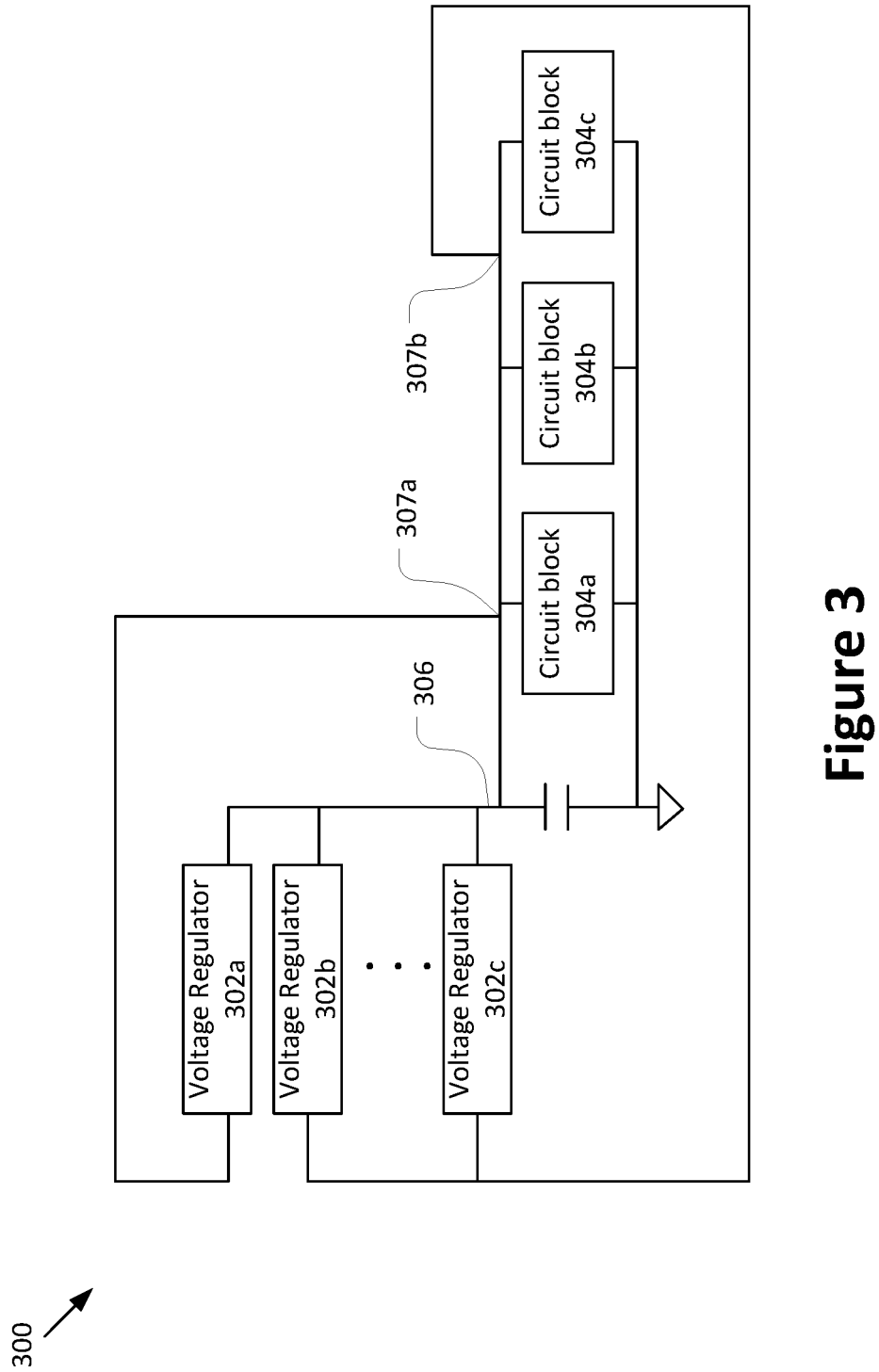
FIG. 3 illustrates a voltage regulator circuit with multiple sense points, in accordance with various embodiments.

For example, FIG. 3 illustrates a voltage regulator circuit 300 (hereinafter "circuit 300") with multiple sense points, in accordance with various embodiments. The circuit 300 may include a plurality of voltage regulators 302a-c to provide a regulated output voltage at an output node 306. The voltage regulators 302a-c may be similar to the voltage regulators 102a-c described herein. The circuit 300 may further include multiple circuit blocks 304a-c coupled to the output node 306. The circuit blocks 304a-c may each receive the output voltage at the output node 306 (e.g., as a power supply). In various embodiments, different voltage regulators 302a-c may be triggered based on different feedback signals from different sense points of the output node 306. For example, the voltage regulator 302a may be triggered based on a first feedback signal from sense point 307a on the output node 306, while voltage regulators 302b and 302c may be triggered based on a second feedback signal from sense point 307b on the output node 306. It will be apparent that other arrangements of different sense points and associated voltage regulators are contemplated.

Some voltage domains may experience local voltage droops that are first and/or only experienced at some locations in the voltage domain. For example, a vector processing unit (VPU) may cause a local voltage droop that is not experienced (e.g., at the same time) by another circuit (e.g., a central processing unit (CPU)) coupled to the same voltage domain. The different sense points 307a-b provided by the circuit 300 may enable the voltage regulator 302a to quickly respond to local droops of the output voltage at the sense point 307a while other voltage regulators (e.g., voltage regulators 302b-c) may respond to droops in the output voltage at one or more other sense points.

Figure 4:
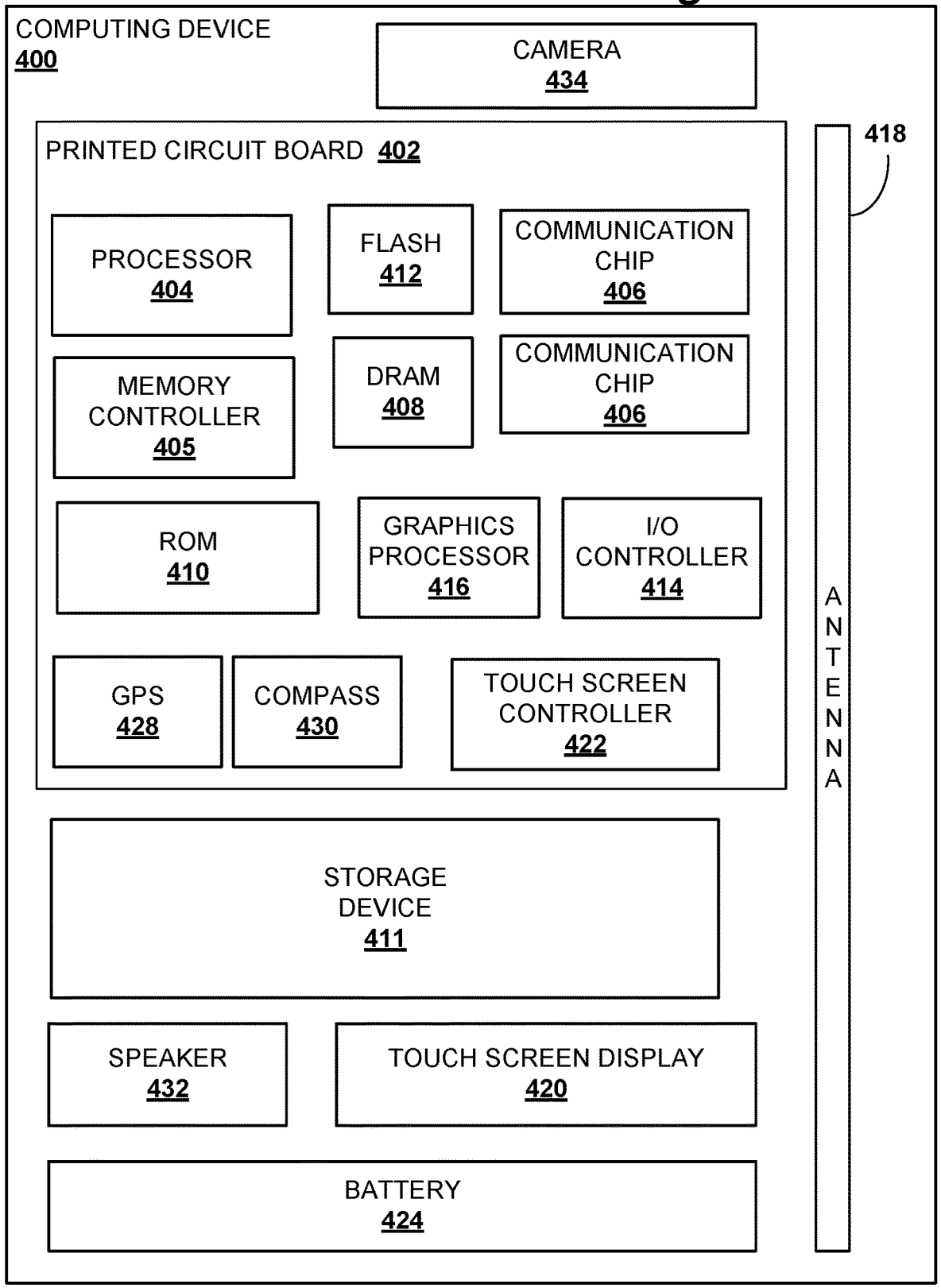
FIG. 4 illustrates an example system configured to employ the apparatuses and methods described herein, in accordance with various embodiments.

FIG. 4 illustrates an example computing device 300 that may employ the apparatuses and/or methods described herein (e.g., circuit 100, voltage regulator 200, circuit 300, etc.), in accordance with various embodiments. As shown, computing device 400 may include a number of components, such as one or more processor(s) 404 (one shown) and at least one communication chip 406. In various embodiments, the one or more processor(s) 404 each may include one or more processor cores. In various embodiments, the at least one communication chip 406 may be physically and electrically coupled to the one or more processor(s) 404. In further implementations, the communication chip 406 may be part of the one or more processor(s) 404. In various embodiments, computing device 400 may include printed circuit board (PCB) 402. For these embodiments, the one or more processor(s) 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, memory controller 405, volatile memory (e.g., dynamic random access memory (DRAM) 408), non-volatile memory such as read only memory (ROM) 410, flash memory 412, storage device 411 (e.g., a hard-disk drive (HDD)), an I/O controller 414, a digital signal processor (not shown), a crypto processor (not shown), a graphics processor 416, one or more antenna 418, a display (not shown), a touch screen display 420, a touch screen controller 422, a battery 424, an audio codec (not shown), a video codec (not shown), a global positioning system (GPS) device 428, a compass 430, an accelerometer (not shown), a gyroscope (not shown), a speaker 432, a camera 434, and a mass storage device (such as hard disk drive, a solid state drive, compact disk (CD), digital versatile disk (DVD)) (not shown), and so forth. In various embodiments, the processor 404 may be integrated on the same die with other components to form a System on Chip (SoC).

In some embodiments, the one or more processor(s) 404, flash memory 412, and/or storage device 411 may include associated firmware (not shown) storing programming instructions configured to enable computing device 400, in response to execution of the programming instructions by one or more processor(s) 404, to practice all or selected aspects of the methods described herein. In various embodiments, these aspects may additionally or alternatively be implemented using hardware separate from the one or more processor(s) 404, flash memory 412, or storage device 411.

In various embodiments, one or more components of the computing device 400 may include circuit 100, voltage regulator 200, circuit 300, and/or employ techniques described herein. For example, the processor 404, communication chip 406, I/O controller 414, memory controller 405, and/or another component of computing device 400 may include the circuit 100, voltage regulator 200, circuit 300, and/or employ the techniques described herein.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth, and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 400 may be any other electronic device that processes data.

Some non-limiting Examples of various embodiments are provided below.

Example 1 is a circuit comprising: a parallel arrangement of discontinuous mode voltage regulators, including a first voltage regulator and a second voltage regulator, to provide a regulated output voltage at an output node; and control circuitry. The control circuitry is to: switch the first voltage regulator to a charge state when the regulated output voltage is below a first lower threshold; and switch the second voltage regulator to the charge state when the regulated output voltage is below a second lower threshold that is less than the first lower threshold.

Example 2 is the circuit of Example 1, wherein the control circuitry is further to: switch the first and second voltage regulators from the charge state to the discharge state; and switch the first and second voltage regulators from the discharge state to the charge state based on a determination that a current through an inductor of the respective first or second voltage regulator is zero.

Example 3 is the circuit of Example 2, wherein the first and second voltage regulators each include: an inductor coupled between the output node and an intermediate node; a pull-up transistor coupled between the intermediate node and a supply rail that is to receive a supply voltage; and a pull-down transistor coupled between the intermediate node and a ground terminal.

Example 4 is the circuit of Example 3, wherein, to switch the first voltage regulator to the charge state, the control circuitry is to turn on the pull-up transistor of the first voltage regulator.

Example 5 is the circuit of Example 4, wherein: to switch the first voltage regulator from the charge state to the discharge state, the control circuitry is to turn off the pull-up transistor and turn on the pull-down transistor; and to switch the first voltage regulator from the discharge state to the tri-state mode, the control circuitry is to turn off the pull-down transistor while the pull-up transistor is to remain off.

Example 6 is the circuit of any of Examples 3-5, wherein the inductor of the first voltage regulator has a greater inductance than the inductor of the second voltage regulator.

Example 7 is the circuit of any of Examples 3-6, wherein the pull-up transistor of the first voltage regulator is smaller than the pull-up transistor of the second voltage regulator.

Example 8 is the circuit of any of Examples 1-7, wherein the control circuitry is further to: switch the first voltage regulator from the charge state to the discharge state when the regulated output voltage is greater than a first upper threshold; and switch the second voltage regulator from the charge state to the discharge state when the regulated output voltage is greater than a second upper threshold that is different from the first upper threshold.

Example 9 is the circuit of any of Examples 1-8, wherein the parallel arrangement of discontinuous mode voltage regulators includes more than 2 discontinuous mode voltage regulators.

Example 10 is the circuit of any of Examples 1-9, wherein the regulated output voltage is provided by only the discontinuous mode voltage regulators.

Example 11 is the circuit of any of Examples 1-10, wherein the control circuitry is to: switch the first voltage regulator to a charge state when the regulated output voltage is below a first lower threshold based on a first feedback signal from a first sense point of the output node; and switch the second voltage regulator to the charge state when the regulated output voltage is below a second lower threshold that is less than the first lower threshold based on a second feedback signal from a second sense point of the output node that is different from the first sense point.

Example 12 is a circuit comprising: a load; and two or more voltage regulators coupled in parallel with one another, the voltage regulators to provide a regulated output voltage to the load at an output node. Each of the voltage regulators includes: an inductor coupled between the output node and an intermediate node; a pull-up transistor coupled between the intermediate node and a supply rail that is to receive a supply voltage; and a pull-down transistor coupled between the intermediate node and a ground terminal. The circuit of Example 12 further includes a control circuit to: detect that the regulated output voltage is less than a threshold of the respective voltage regulator, wherein different voltage regulators of the two or more voltage regulators have different thresholds; and turn on the pull-up transistor responsive to the detection.

Example 13 is the circuit of Example 12, wherein the control circuit is to turn on the pull-up transistor to place the voltage regulator in a first state, and wherein the control circuit is further to: turn off the pull-up transistor and turn on the pull-down transistor to switch the voltage regulator from the first state to a second state; detect that a current through the inductor is zero; and turn off the pull-down transistor, responsive to the detection, to switch the voltage regulator from the second state to a third state.

Example 14 is the circuit of Example 12 or 13, wherein the inductor of the first voltage regulator has a greater inductance than the inductor of the second voltage regulator.

Example 15 is the circuit of any of Examples 12-14, wherein the pull-up transistor of the first voltage regulator is smaller than the pull-up transistor of the second voltage regulator.

Example 16 is the circuit of any of Examples 12-15, wherein the pull-up transistor is a first pull-up transistor, wherein the pull-down transistor is a first pull-down transistor, and wherein each voltage regulator further includes: a second pull-up transistor coupled between the first pull-up transistor and the intermediate node; and a second pull-down transistor coupled between the first pull-down transistor and the intermediate node.

Example 17 is the circuit of any of Examples 12-16, wherein the two or more voltage regulators and the load are on a same integrated circuit die.

Example 18 is a system comprising: an integrated circuit, the integrated circuit comprising: a circuit block; and two or more discontinuous mode voltage regulators, including a first voltage regulator and a second voltage regulator, coupled in parallel with one another to provide a regulated output voltage to the circuit block. Each of the discontinuous mode voltage regulators includes: a pull-up transistor coupled between an internal node and a power supply rail that is to receive a supply voltage; and a pull-down transistor coupled between the internal node and a ground terminal. The integrated circuit further comprises control circuitry coupled to the two or more discontinuous mode voltage regulators, the control circuitry to: turn on the pull-up transistor of the first voltage regulator when the regulated output voltage rises above a first upper threshold; and turn on the pull-up transistor of the second voltage regulator when the regulated output voltage rises above a second upper threshold that is greater than the first upper threshold. The system of Example 18 further comprises one or more of a memory circuit, a display, or an antenna coupled to the integrated circuit.

Example 20 is the system of Example 19, wherein the control circuitry is further to: turn off the pull-up transistor and turn on the pull-down transistor of the first voltage regulator when the regulated output voltage is greater than a first upper threshold; and turn off the pull-up transistor and turn on the pull-down transistor of the second voltage regulator when the regulated output voltage is greater than a second upper threshold, wherein the first upper threshold is less than the second upper threshold.

Example 21 is the system of Example 20, wherein the control circuitry is to turn on the pull-down transistor until a current through an inductor of the respective discontinuous mode voltage regulator is zero and then turn off the pull-down transistor.

Example 22 is the system of any one of Examples 19-21, wherein the discontinuous mode voltage regulators are to provide the regulated output voltage at an output node, and wherein each of the discontinuous mode voltage regulators further includes an inductor coupled between the respective internal node and the output node.

Example 23 is the system of Example 22, wherein the inductor of the first voltage regulator has a greater inductance than the inductor of the second voltage regulator.

Example 24 is the circuit of any of Examples 19-23, wherein the pull-up transistor of the first voltage regulator is smaller than the pull-up transistor of the second voltage regulator.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A circuit comprising:
   a parallel arrangement of discontinuous conduction mode voltage regulators, including a first voltage regulator and a second voltage regulator, to provide a regulated output voltage at an output node; and
   control circuitry to:
      switch the first voltage regulator to a charge state from a discharge state when the regulated output voltage is below a first lower threshold, wherein, in the charge state, a supply rail is coupled to the output node and wherein, in the discharge state, a ground terminal is coupled to the output node; and
      switch the second voltage regulator to the charge state from the discharge state when the regulated output voltage is below a second lower threshold that is less than the first lower threshold.

2. The circuit of claim 1, wherein the control circuitry is further to:
   switch the first and second voltage regulators from the charge state to the discharge state; and
   switch the first and second voltage regulators from the discharge state to a tri-state mode based on a determination that a current through an inductor of the respective first or second voltage regulator is zero.

3. The circuit of claim 2, wherein the first and second voltage regulators each include:
   an inductor coupled between the output node and an intermediate node;
   a pull-up transistor coupled between the intermediate node and the supply rail that is to receive a supply voltage; and
   a pull-down transistor coupled between the intermediate node and the ground terminal.

4. The circuit of claim 3, wherein, to switch the first voltage regulator to the charge state from the discharge state, the control circuitry is to turn on the pull-up transistor of the first voltage regulator and turn off the pull-down transistor of the first voltage regulator.

5. The circuit of claim 4, wherein:
   to switch the first voltage regulator from the charge state to the discharge state, the control circuitry is to turn off the pull-up transistor of the first voltage regulator and turn on the pull-down transistor of the first voltage regulator; and
   to switch the first voltage regulator from the discharge state to the tri-state mode, the control circuitry is to turn off the pull-down transistor of the first voltage regulator while the pull-up transistor of the first voltage regulator is to remain off.

6. The circuit of claim 3, wherein the inductor of the first voltage regulator has a greater inductance than the inductor of the second voltage regulator.

7. The circuit of claim 3, wherein the pull-up transistor of the first voltage regulator is smaller than the pull-up transistor of the second voltage regulator.

8. The circuit of claim 1, wherein the control circuitry is further to:
   switch the first voltage regulator from the charge state to the discharge state when the regulated output voltage is greater than a first upper threshold; and
   switch the second voltage regulator from the charge state to the discharge state when the regulated output voltage is greater than a second upper threshold that is different from the first upper threshold.

9. The circuit of claim 1, wherein the parallel arrangement of discontinuous conduction mode voltage regulators includes more than 2 discontinuous conduction mode voltage regulators.

10. The circuit of claim 1, wherein the regulated output voltage is provided by only the discontinuous conduction mode voltage regulators.

11. The circuit of claim 1, wherein the control circuitry is to:
   switch the first voltage regulator to a charge state when the regulated output voltage is below the first lower threshold based on a first feedback signal from a first sense point of the output node; and
   switch the second voltage regulator to the charge state when the regulated output voltage is below the second lower threshold that is less than the first lower threshold based on a second feedback signal from a second sense point of the output node that is different from the first sense point.

12. A circuit comprising:
   a load;
   two or more voltage regulators coupled in parallel with one another, the two or more voltage regulators to provide a regulated output voltage to the load at an output node, wherein each of the two or more voltage regulators includes:

an inductor coupled between the output node and an intermediate node;
a pull-up transistor coupled between the intermediate node and a supply rail that is to receive a supply voltage; and
a pull-down transistor coupled between the intermediate node and a ground terminal; and
control circuitry to:
detect that the regulated output voltage is less than a threshold of the respective voltage regulator, wherein different voltage regulators of the two or more voltage regulators have different thresholds; and
turn on the pull-up transistor of the respective voltage regulator from an off state and turn off the pull-down transistor of the respective voltage regulator from an on state responsive to the detection.

13. The circuit of claim 12, wherein the control circuitry is to turn on the pull-up transistor of the respective voltage regulator to place the respective voltage regulator in a first state, and wherein the control circuitry is further to:
turn off the pull-up transistor of the respective voltage regulator and turn on the pull-down transistor of the respective voltage regulator to switch the respective voltage regulator from the first state to a second state;
detect that a current through the inductor of the respective voltage regulator is zero; and
turn off the pull-down transistor of the respective voltage regulator, responsive to the detection, to switch the respective voltage regulator from the second state to a third state.

14. The circuit of claim 12, wherein the inductor of a first voltage regulator of the two or more voltage regulators has a greater inductance than the inductor of a second voltage regulator of the two or more voltage regulators.

15. The circuit of claim 12, wherein the pull-up transistor of a first voltage regulator of the two or more voltage regulators is smaller than the pull-up transistor of a second voltage regulator of the two or more voltage regulators.

16. The circuit of claim 12, wherein the pull-up transistor is a first pull-up transistor, wherein the pull-down transistor is a first pull-down transistor, and wherein each one of the two or more voltage regulators further includes:
a second pull-up transistor coupled between the first pull-up transistor and the intermediate node; and
a second pull-down transistor coupled between the first pull-down transistor and the intermediate node.

17. The circuit of claim 12, wherein the two or more voltage regulators and the load are on a same integrated circuit die.

18. A system comprising:
an integrated circuit, the integrated circuit comprising:
a circuit block;
two or more discontinuous conduction mode voltage regulators, including a first voltage regulator and a second voltage regulator, coupled in parallel with one another to provide a regulated output voltage to the circuit block, wherein each of the two or more discontinuous conduction mode voltage regulators includes:
a pull-up transistor coupled between an internal node and a power supply rail that is to receive a supply voltage; and
a pull-down transistor coupled between the internal node and a ground terminal;
control circuitry coupled to the two or more discontinuous mode voltage regulators, the control circuitry to:
turn on the pull-up transistor of the first voltage regulator from an off state and turn off the pull-down transistor of the first voltage regulator from an on state when the regulated output voltage falls below a first lower threshold; and
turn on the pull-up transistor of the second voltage regulator from the off state and turn off the pull-down transistor of the second voltage regulator from the on state when the regulated output voltage falls below a second lower threshold that is less than the first lower threshold; and
one or more of a memory circuit, a display, or an antenna coupled to the integrated circuit.

19. The system of claim 18, wherein the control circuitry is further to:
turn off the pull-up transistor of the first voltage regulator and turn on the pull-down transistor of the first voltage regulator when the regulated output voltage is greater than a first upper threshold; and
turn off the pull-up transistor of the second voltage regulator and turn on the pull-down transistor of the second voltage regulator when the regulated output voltage is greater than a second upper threshold, wherein the first upper threshold is less than the second upper threshold.

20. The system of claim 19, wherein the control circuitry is to turn on the pull-down transistor of the first voltage regulator until a current through an inductor of the first voltage regulator is zero and then turn off the pull-down transistor of the first voltage regulator.

21. The system of claim 18, wherein the two or more discontinuous conduction mode voltage regulators are to provide the regulated output voltage at an output node, and wherein each of the two or more discontinuous mode voltage regulators further includes an inductor coupled between the respective internal node and the output node.

22. The system of claim 21, wherein the inductor of the first voltage regulator has a greater inductance than the inductor of the second voltage regulator.

23. The circuit of claim 22, wherein the pull-up transistor of the first voltage regulator is smaller than the pull-up transistor of the second voltage regulator.

\* \* \* \* \*